United States Patent
Chan et al.

(10) Patent No.: US 10,135,836 B2
(45) Date of Patent: Nov. 20, 2018

(54) MANAGING DATA PRIVACY AND INFORMATION SAFETY

(71) Applicant: International Business Machines Corporation, Armonk, NY (US)

(72) Inventors: Yuk L. Chan, Rochester, NY (US); Christopher Cramer, Troy, NY (US); Deepti M. Naphade, Cupertino, CA (US); Jairo A. Pava, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/753,114

(22) Filed: Jun. 29, 2015

(65) Prior Publication Data

US 2016/0381034 A1     Dec. 29, 2016

(51) Int. Cl.
| | | |
|---|---|---|
| G06F 7/04 | (2006.01) | |
| H04L 29/06 | (2006.01) | |
| H04L 12/58 | (2006.01) | |
| H04W 12/02 | (2009.01) | |

(52) U.S. Cl.
CPC ........... *H04L 63/104* (2013.01); *H04L 51/12* (2013.01); *H04L 51/32* (2013.01); *H04L 63/1433* (2013.01); *H04L 63/1441* (2013.01); *H04W 12/02* (2013.01); *H04L 51/063* (2013.01)

(58) Field of Classification Search
CPC ..................................................... G06Q 10/10
USPC ........................................................ 707/732
See application file for complete search history.

(56) References Cited

U.S. PATENT DOCUMENTS

| | | |
|---|---|---|
| 8,127,365 B1 | 2/2012 | Lui et al. |
| 8,234,688 B2 | 7/2012 | Grandison et al. |
| 8,706,648 B2 | 4/2014 | Bhola et al. |
| 8,788,816 B1 | 7/2014 | Spaulding et al. |
| 2011/0270719 A1 | 11/2011 | Hollars et al. |
| 2012/0180135 A1 | 7/2012 | Hodges et al. |
| 2013/0091147 A1 | 4/2013 | Kim et al. |
| 2013/0091582 A1 | 4/2013 | Chen et al. |
| 2013/0104246 A1 | 4/2013 | Bear et al. |
| 2013/0117281 A1 | 5/2013 | Fleet et al. |
| 2013/0125201 A1 | 5/2013 | Sprague et al. |
| 2013/0204705 A1 | 8/2013 | Song |
| 2013/0268589 A1 | 10/2013 | Torgersrud et al. |
| 2013/0282841 A1* | 10/2013 | Bates ............ H04L 51/12 709/206 |
| 2013/0325870 A1 | 12/2013 | Rouse et al. |
| 2015/0143531 A1 | 5/2015 | Gjonej et al. |
| 2015/0381628 A1 | 12/2015 | Steinberg et al. |

(Continued)

FOREIGN PATENT DOCUMENTS

WO     2011001250 A1     1/2011

OTHER PUBLICATIONS

Alur, et al., "LinkIntegrity+: A Web Asset Integrity Solution," IBM Almaden Research Center, pp. 1-10.

(Continued)

*Primary Examiner* — Christopher J Brown
(74) *Attorney, Agent, or Firm* — Robert C. Bunker (57) ABSTRACT

Automatically screen data associated with a user that may have already been shared on a social network or about to be shared on the social network for a potential security risk and assign a risk score to the data. If the assigned risk score is above a threshold risk score, a risk mitigation measure is generated and executed.

16 Claims, 6 Drawing Sheets

(56) References Cited

U.S. PATENT DOCUMENTS

2016/0182556 A1* 6/2016 Tatourian .............. G06F 21/554
　　　　　　　　　　　　　　　　　　　　　　　726/25
2016/0381064 A1 12/2016 Chan et al.

OTHER PUBLICATIONS

"Criminals Using Facebook to Get Into Homes", http://www.wsfa.com/global/story.asp?s=10830247, accessed Feb. 19, 2015, pp. 1-2.
Mell et al. The NIST Definition of Cloud Computing, National Institute of Standards and Technology, Special Publication 800-145, Sep. 2011, pp. 1-7.
IBM: List of IBM Patents or Patent Applications Treated as Related (Appendix P), Apr. 15, 2016, pp. 1-2.
Chan et al., Pending U.S. Appl. No. 15/099,631, filed Apr. 15, 2016, titled "Managing Data Privacy and Information Safety," pp. 1-35.

* cited by examiner

MANAGING DATA PRIVACY AND INFORMATION SAFETY

BACKGROUND

The present invention relates generally to the field of protection of data processing, and more particularly to managing data privacy and information safety on social networks.

Social network users uploading information onto a social network may inadvertently share sensitive information online. For example, a user posting vacation pictures to a social network in real-time while still on vacation may expose the security of the user's belongings back at the user's residence to undesirable acts by ill-minded intruders who may use such sensitive information to plan a burglary in the user's residence during user's absence.

SUMMARY

According to an embodiment of the invention, a method for dynamically evaluating and mitigating risk associated with data shared on a social network is provided. The method may receive data associated with a user, by a computing device, for posting on a social network. The method may assign a category to the received data. The method may assign a risk score to the received data based on predefined risk scores associated with the assigned category. The method may also generate a risk mitigation measure based on the assigned risk score being greater than a threshold risk score, the risk mitigation measure comprising one or more of: (i) modifying the data, (ii) deleting the data, (iii) retaining the data wherein the data is not posted to the social network until receiving an instruction to post the data to the social network, (iv) removing metadata associated with the received data, and (v) communicating a message regarding the data to a device.

According to another embodiment of the invention, a computer program product for dynamically evaluating and mitigating risk associated with data shared on a social network is provided. The computer program product includes one or more computer-readable storage media and program instructions stored on the one or more computer-readable storage media, the program instructions executable by a processor. The computer program product may include program instructions to receive data associated with a user, by a computing device, for posting on a social network. The computer program product may also include program instructions to assign a category to the received data. The computer program product may also include program instructions to assign a risk score to the received data based on predefined risk scores associated with the assigned category. The computer program product may also include program instructions to generate a risk mitigation measure based on the assigned risk score being greater than a threshold risk score, the risk mitigation measure comprising one or more of: (i) modifying the data, (ii) deleting the data, (iii) retaining the data wherein the data is not posted to the social network until receiving an instruction to post the data to the social network, (iv) removing metadata associated with the received data, and (v) communicating a message regarding the data to a device.

According to another embodiment of the invention, a computer system for dynamically evaluating and mitigating risk associated with data shared on a social network is provided. The computer system includes one or more computer processors, one or more computer-readable storage media, and program instructions stored on the computer-readable storage media for execution by at least one of the one or more processors. The computer system includes program instructions to receive data associated with a user, by a computing device, for posting on a social network. The computer system may also include program instructions to assign a category to the received data. The computer system may also include program instructions to assign a risk score to the received data based on predefined risk scores associated with the assigned category. The computer system may also include program instructions to generate a risk mitigation measure based on the assigned risk score being greater than a threshold risk score, the risk mitigation measure comprising one or more of: (i) modifying the data, (ii) deleting the data, (iii) retaining the data wherein the data is not posted to the social network until receiving an instruction to post the data to the social network, (iv) removing metadata associated with the received data, and (v) communicating a message regarding the data to a device.

BRIEF DESCRIPTION OF THE SEVERAL VIEWS OF THE DRAWINGS

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with one embodiment, it is submitted that it is within the knowledge of one skilled in the art to affect such feature, structure, or characteristic in connection with other embodiments whether or not explicitly described.

A social network user posting information to a social network may inadvertently share sensitive information online which an ill-minded intruder may use to plan illegal activities negatively affecting the user, for example, by scheduling a burglary in the user's residence while the user is on a vacation based on information on an impending vacation included in one of the user's posts to the social network. However, it may be cumbersome for a typical user to manually analyze and predict all prospective undesirable side-effects that may result from the user's posts to the social network. It may be desirable to have a system that may automatically screen posts to a social network impacting a user for potential security risks before or soon after they get posted online.

Embodiments of the present invention may automatically screen data associated with a user that may have already been shared on a social network or about to be shared on the social network for a potential security risk. The data being screened may include a social network post ("SNP") made on a social network web-page or "wall". The screening may occur prior to a SNP being posted or immediately after it is posted on a social network. Embodiments of the present invention may assign a risk information category and a risk score based on predefined risk scores associated with the assigned category to the data. If the assigned risk score is above a threshold risk score, embodiments of the present invention may generate and execute a risk mitigation measure.

As used herein, "social network" refers to a computer network connecting entities, such as people or organizations, by a set of social relationships, such as friendship, co-working, or a community representing a group of members sharing common interests or characteristics. A social network may include blogs and forums. The social network may foster relationships between its members, thereby offering a higher level of affiliation and trust than other online media through which users can interact with each other such as electronic message boards or forums. The social network may display social network posts (SNP) posted by a plurality of users on the social network. Social network may also refer to a computer application or data connecting such entities by such social relationships. Social network may provide an avenue for users to post information and respond to previously posted information by self and others. Members of a social network may elect to exchange information with or transmit information to all participants within the social network, a minority of participants, or a group that encompasses other participants plus others that may be connected by a second or subsequent degree links (such as e.g., friends of friends). Exchange with or among second or subsequent degree members may also be denied, limited or restricted for safety and security reasons. A social networks may include an administrator that uses lists to control the membership in the social network.

Embodiments of the present invention may utilize data analytic systems well known in the art to categorize a SNP and to assign a risk score to the SNP if it the SNP deemed to present a potential security risk and apply a risk mitigation measure associated with the SNP. Embodiments of the present invention may compute a risk score for a risk that the user may have no control of or no knowledge of. The risk score may be computed using data analytic systems known in the art based on dynamic inputs and trending data, in addition to static factors. Embodiments of the present invention may present the user with options to either automatically or manually mitigate a risk. Embodiments of the present invention may also provide the user with the ability to override a risk mitigation measure implemented by embodiments of the present invention.

Risk mitigation measures may include: alerting the user of the potential security risk, editing the SNP, removing a portion of the SNP, deleting the entire SNP, hiding a portion of the SNP or the whole SNP from certain viewers on a social network, blurring a portion of a digital image that may form part of the SNP. Embodiments of the present invention may customize its service features based on factors that may include: a user's risk tolerance level, locale of the user, valuables owned by the user, frequency of real-time SNPs uploaded by the user, frequency of real-time SNPs uploaded members in user's network, general content of SNPs uploaded by the user and by members in the user's network, and characteristics associated with the user. Embodiments of the present invention may use updated security threat and security risk information available from public and private domains, and analyze them for predicting a security risk contained in data present in a specific SNP in light of a user's individual characteristics including aspects such as: activity type, location, time, age, marital status, profession, household income, gender, ethnicity, recent criminal activity in an area, and type of data shared on the social network. For example, when robberies occur in the user's neighborhood in residences of individuals with a similar personal profile as the user, embodiments of the present invention may generate an alert customized to the user.

Embodiments of the present invention may computationally evaluate whether a whole SNP or a portion of a SNP should be shared on a social network, thereby providing for granular control of managing security risks posed by a SNP. Embodiments of the present invention may provide advantages over manual risk management of SNPs by a human administrator. An administrator manually reviewing SNPs for such a manual risk mitigation mechanism may have limitations such as: time delay in implementing the risk mitigation mechanism; in-consistent subjective criteria being exercised; administrator knowledge of risks being outdated; inefficiency arising from fast changing risk scenarios; administrator not capable of making a decision or making an incorrect decision in a given context due to complexity of information; and, special training requirements needed to keep administrator up to date on emerging risks, among others.

Embodiments of the present invention may automatically apply a risk mitigation measure in a scenario where a user may not have posted a SNP but may be exposed to a security risk due to a SNP by the user's roommate indicating that both the user and the roommate are currently at a vacation spot located far from a location where their rooms may be situated. Embodiments of the present invention may also automatically apply risk mitigation measures in an embodiment where the user's SNP may not pose a security risk, but one or more follow-up SNPs being posted by others in response to the user's SNP may generate a potential security risk. For example, a follow-up SNP by a member in user's network may point out that an expensive car remains parked at a garage in user's residence while user is out of town, thus generating a risk. Embodiments of the present invention may recommend and apply risk mitigation measures in such a scenario.

In one scenario, embodiments of the present invention may just remove a user's current location included in the user's SNP as a risk mitigation measure. In another scenario, embodiments of the present invention may delay the posting of a SNP to a social network temporally until a security risk is eliminated. In another scenario, embodiments of the present invention may allow sensitive data in a SNP to be selectively viewable only by a few people within the user's network that are on a list of "trusted members". In another scenario, embodiments of the present invention may allow a complete unedited version of a SNP to be available for view by a few trusted members in user's network while simultaneously allowing an edited version that has been stripped of sensitive information, to be viewable by others. In another scenario, embodiments of the present invention may strip off metadata such as, for example, GPS location information and time stamps associated with a SNP before it gets posted to a social network. In another scenario, embodiments of the present invention may blur a portion of a digital image in order that a landmark present in the image may be rendered unrecognizable before SNP is posted to a social network. In another scenario, embodiments of the present invention may trim a portion of a digital image. In another scenario, embodiments of the present invention may permit only selected people in a user's social network to view certain data flagged to be sensitive.

The present invention will now be described in detail with reference to the figures. All brand names and/or trademarks used herein are the property of their respective owners.

Figure 1:
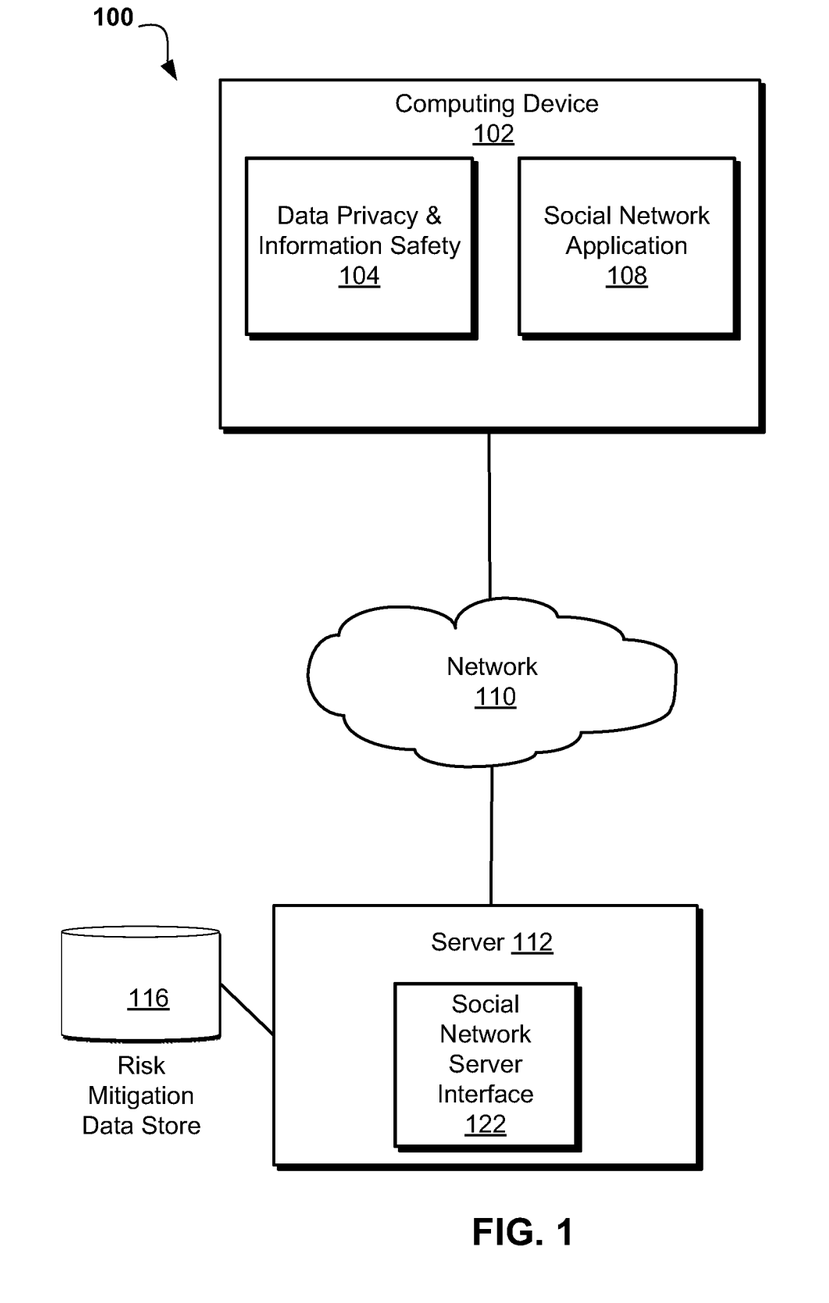
FIG. 1 is a functional block diagram illustrating a data privacy and information safety environment, in accordance with an embodiment of the present invention.

FIG. 1 is a functional block diagram illustrating an exemplary data privacy and information safety environment 100 for managing data privacy and information safety associated with data posted to social networks. In various embodiments of the present invention data privacy and information safety environment 100 may include a computing device 102 and a server 112, connected over network 110.

The network 110 represents a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 110 may also include a number of different types of networks, such as, for example, an intranet, a local area network (LAN), or a wide area network (WAN).

Computing device 102 represents a network connected user computing device on which data privacy and information safety associated with data posted to social networks will be managed, in accordance with various embodiments of the invention. The computing device 102 may be, for example, a mobile device, a smart phone, a personal digital assistant, a netbook, a laptop computer, a tablet computer, a desktop computer, or any type of computing device capable of running a program and accessing a network, in accordance with one or more embodiments of the invention. In an embodiment, the computing device 102, and the server 112, which will be explained later, may form part of an enterprise system. Computing device 102 may include internal and external hardware components, as depicted and described in further detail below with reference to FIG. 4. In other embodiments, computing device 102 may represent, for example, a local computing device 54A-N in a cloud computing environment, as described in relation to FIGS. 4, 5, and 6, below. In an embodiment, system components within computing device 102, for example, RAM 30 (FIG. 4), may include read-only registers and/or other data stores that contain device, network ID, user, system date/time, and other system and user information that may be accessible, for example, by application programming interfaces (APIs). Computing device 102 may also support data and screen capture, for example, by one or more proprietary or open source screen capture APIs.

In one embodiment, the computing device 102 may include applications such as a social network application 108 and a data privacy & information safety 104. Social network application 108 represents an interface that may be used to access various social networks. In an exemplary embodiment, Social network application 108 may be, for example, an application that interfaces with a network application, such as social network server interface 122 on server 112, both described in more detail below, or interfaces with a local application residing on computing device 102, such as data privacy & information safety 104, described in more detail below. In other embodiments, social network application 108 may represent an interface that is integral to a local application residing on computing device 102, such as the data privacy & information safety 104. In various embodiments, Social network application 108 may support monitoring of data included in SNPs shared on social networks impacting a user, for example, by one or more proprietary or open source APIs or add-ons, so that an API or add-on may signal that data impacting the user has been shared on a social network.

Social network server interface 122 represents an interface that data privacy & information safety 104, social network application 108 and a user utilizes to interact with a social network. In one embodiment, social network server interface 122 represents an application that updates or otherwise augments the information available on the risk mitigation data store 116, to be described later. In one embodiment, extension application 126 may represent an application that may permit a user to select the right risk tolerance level and the appropriate privacy setting. In one embodiment, social network server interface 122 may interact with data privacy & information safety 104 in updating the contents of the risk mitigation data store 116. In this mode, extension application 126 may permit a user to receive up-to-date information on new and evolving security risks based on the user's characteristics.

Risk mitigation data store 116 represents a database that includes information associated with risk mitigation. In one embodiment, risk mitigation data store 116 may interact with databases available on the worldwide web through social network server interface 122 to collect and index security threats and risks associated with data included in SNPs. In one embodiment, risk mitigation data store 116, through social network server interface 122, may represent a gateway to risk cataloguing knowledge databases such as, for example, an online public safety information database maintained by a governmental entity or a private entity. In one embodiment, risk mitigation data store 116 may represent a database that includes organized collection of data containing information corresponding to risk information categories. In one embodiment, risk mitigation data store 116 may represent a database that contains a listing of all databases available on the worldwide web that contain information related to security risks associated with data included in SNPs shared on social networks. In one embodiment, risk mitigation data store 116 may be updated with new information via manual user entry through a user interface on computing device 102 or through other means such as by automatic periodic data transfers from an online database to risk mitigation data store 116. In an exemplary embodiment, risk mitigation data store 116 is stored locally on server 112, however in other embodiments, context-sensitive translation & reformatting data store 116 may be located remotely and accessed via a network such as network 110.

Data privacy & information safety 104 operates to dynamically evaluate, categorize, assign a security risk score, recommend and undertake a risk mitigation measure to mitigate a security risk associated with data included in a social network post (SNP) shared on a social network.

Figure 2:
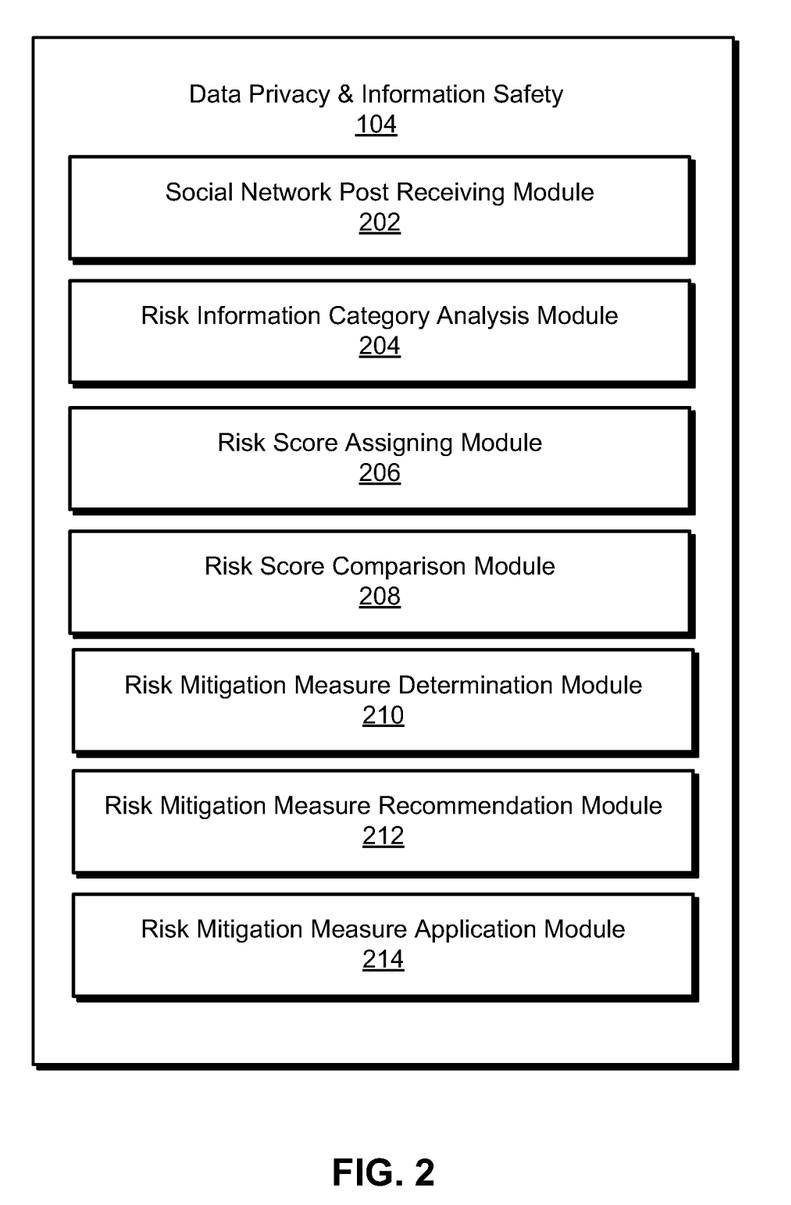
FIG. 2 is a functional block diagram illustrating modules of a data privacy and information safety environment program, in accordance with one embodiment of the present invention.

FIG. 2 depicts modules that form part of data privacy & information safety 104 of FIG. 1 that, in one embodiment, may include: social network post receiving module 202, risk information category analysis module 204, risk score assigning module 206, risk score comparison module 208, risk mitigation measure determination module 210, risk mitigation measure recommendation module 212, and risk mitigation measure application module 214.

Social network post receiving module 202 may operate to monitor a user's online social network account on an ongoing basis and receive data associated with an original or secondary SNP shared on a social network or to be shared on the social network. Risk information category analysis module 204 may operate to analyze data in the SNP for the presence of any potential security threats or risks to the user from the data in the SNP. Risk score assigning module 206 may operate to assign a risk score for an identified risk information category that was assigned by risk information category analysis module 204. Risk score comparison module 208 may operate to compare the sum of all assigned risk scores under all identified risk information categories for the data in the SNP with the sum of the threshold risk scores found in a table comprising threshold risk scores associated with multiple risk information categories. Risk mitigation measure determination module 210 may operate to determine one or more risk mitigation measures that may reduce, minimize or neutralize the security risk associated with the data. Risk mitigation measure recommendation module 212 may operate to recommend a risk mitigation measure based on a determination made by risk mitigation measure determination module 210. Risk mitigation measure application module 214 may operate to apply the risk mitigation mechanism identified by risk mitigation measure determination module 210 and recommended by risk mitigation measure recommendation module 212.

Figure 3:
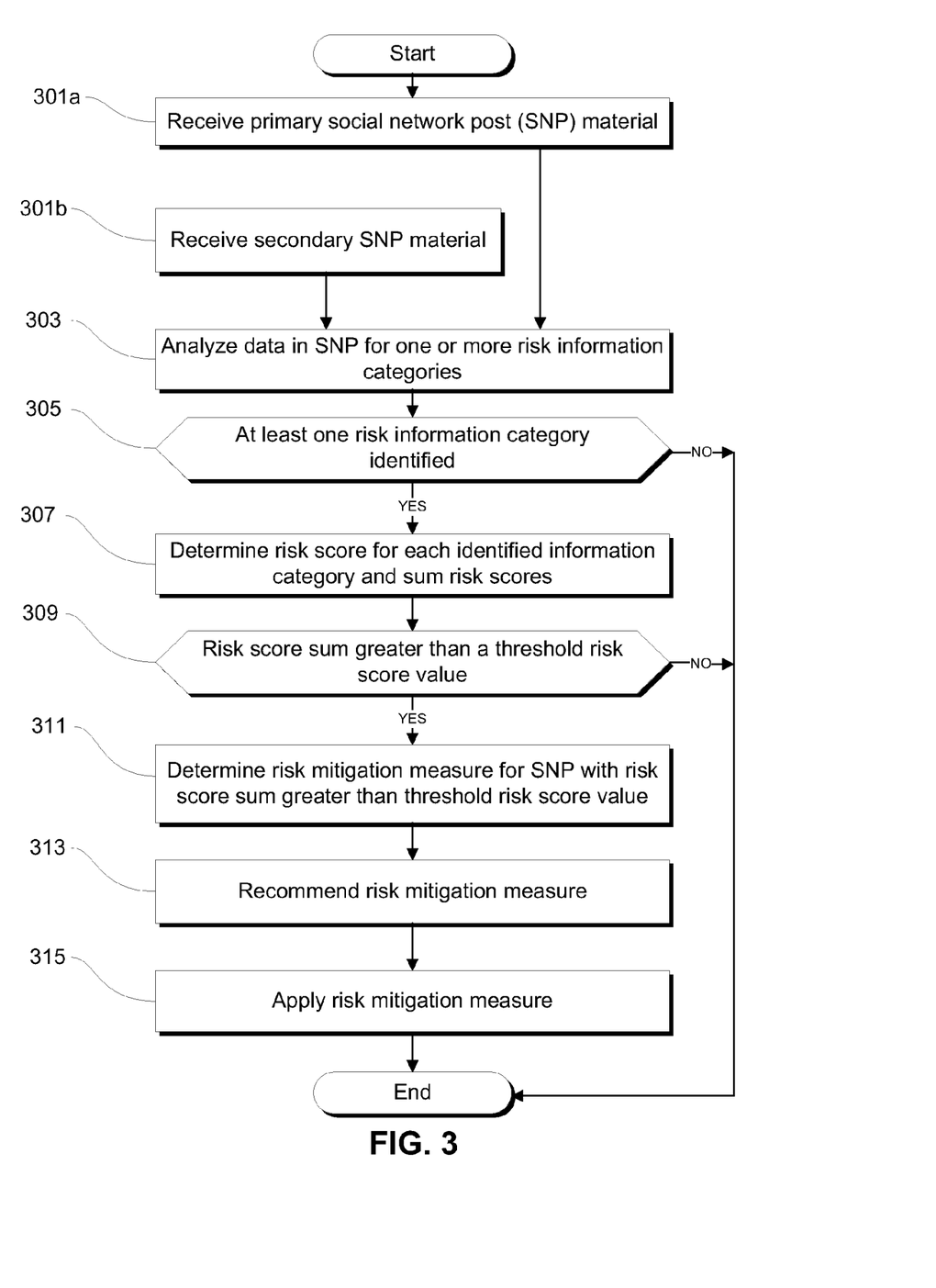
FIG. 3 is a flowchart illustrating operational steps of the data privacy and information safety program, in accordance with an embodiment of the present invention.

FIG. 3 is a flowchart depicting operational steps of data privacy & information safety 104, in accordance with one embodiment of the present invention. Steps depicted in FIG. 3 may be implemented using one or more modules of a computer program such as the data privacy & information safety 104, and executed by a processor of a computer such as computing device 102 or server 112.

Social network post receiving module 202 may monitor a user's online social network account on an ongoing basis and at 301a, social network post receiving module 202 may receive data associated with an original SNP shared on a social network or to be shared on the social network. In one embodiment, the SNP may be shared on a user's personal web-page on the social network either by the user or a source associated with the user. In one embodiment, the source may represent another person connected to the user and authorized by the user to share data on the user's personal web-page on the social network. The received data may include text, digital images, audio and video.

In one embodiment, at 301b, social network post receiving module 202 may receive a secondary SNP posted to the social network that may represent data associated with an original post by the user. In one embodiment, the secondary SNP may represent data corresponding to a post that includes information related to the user, but not posted by the user, but posted by another source. In one embodiment, social network post receiving module 202 may identify an association between the original SNP and the secondary SNP.

At 303, risk information category analysis module 204 may analyze the SNP for the presence of any potential security threats or risks to the user from the data in the SNP. Risk information category analysis module 204 may accomplish this by first identifying one or more risk information categories associated with the data.

At 305, risk information category analysis module 204 may identify one or more risk information categories associated with the data. The risk information categories assigned by risk information category analysis module 204 include: time, location, activity type, trend, frequency of repeated occurrence of an event, and targeted population associated with the data. As illustrative examples, the risk information categories may include: a targeted population of children between five years old and ten years old, female teenagers between the ages of 16 and 18 years old, people residing in individual houses, home owners, teenagers, and seniors above 70 years old; locations that cannot be reached from the U.S. mainland such as tourist resorts in the Caribbean islands; and, house break-in events that occur more often than 50 incidents/month within a city. In determining all risk information categories associated with the data, risk information category analysis module 204 may access information stored in risk mitigation data store 116. In one embodiment, risk information category analysis module 204 may access a data analytics engine (not shown) via network 110 to help identify one or more risk information categories associated with the received data. In one embodiment, risk information category analysis module 204 may assign more than one risk information categories to a single set of data.

In an exemplary embodiment that includes a securing risk of residences of individuals of Chinese ethnicity being burglarized during the Chinese New Year may assign the following risk information categories to the data included in a SNP: location (is user expected to be away from home for a period greater than a predefined time duration); time (does the data describe an event scheduled to occur in the future or at present); activity (does the data describe an activity that is expected to occur longer than a predefined time duration); and, ethnicity (whether the user is of Chinese ancestry).

In one exemplary embodiment, in order to identify a risk information category of location, risk information category analysis module 204 may determine whether a location of the user may be identified from the data. In one scenario, the location may be inferred by a geographical location spelt out in the data. In another scenario, it may be inferred by a famous physical landmark included in a digital image present in the data. The same data may also include a time category associated with it, such as for example, a text string included in the data indicating that a picture included in the data was taken 10 days ago.

At 307, risk score assigning module 206 may assign a risk score for an identified risk information category that was assigned by risk information category analysis module 204. Risk score assigning module 206 may assign the risk score for the risk information category based on a sensitive item contained in the data. The sensitive item may include: a timeliness of a statement contained in the data, a location indicated in the data, a precision of the statement contained in the data, an activity indicated in the data, and a risk-susceptible item contained in the data. In assigning the risk score, risk score assigning module 206 may access information available from the risk mitigation data store 116 and information available on the worldwide web and accessible via social network server interface 122. Risk score assigning module 206 may utilize such accessed information in order to assign a risk score data based on predefined risk scores associated with the assigned category, as catalogued in a table format available within or through the risk mitigation data store 116. In one embodiment, assignment of the risk score may be based on one or more characteristics associated with the user, the characteristics including: an activity type mentioned in the data in the SNP, a location indicated in the data, a time mentioned in the data, an age of the user, a marital status of the user, a profession of the user, an household income associated with the user, a gender of the user, an ethnicity associated with the user, and a recent criminal activity in an area associated with the user. In one embodiment, risk score assigning module 206 may use a defined social network privacy goal of the user to determine the risk score associated with a risk information category corresponding to the data included in the SNP.

In an exemplary embodiment that includes a risk information category of time, risk score assigning module 206 may assign a risk score based on predefined characteristics associated with the user as follows: an event described in the data occurred in the past=risk score of 0; event to occur at least one month in the future=risk score of 1; and event occurring at the instant the data was posted=risk score of 2; and event to occur within the next 30 days=risk score of 3.

In an exemplary embodiment that includes a risk information category of frequency of repeated occurrence of an event that corresponds to several children kidnapping incidents that recently occurred in the city of Miami, Fla. risk score assigning module 206 may assign a risk score based on predefined characteristics associated with the user as follows: a user with children vacationing in Albany, N.Y.=risk score of 0; a user with children vacationing in Miami, Fla.=risk score of 0; and a user with children permanently residing in Miami, Fla.=risk score of 2.

Risk score assigning module 206 may then calculate a sum of all assigned risk scores under all identified risk information categories for the data. In one embodiment, risk score assigning module 206 may calculate a weighted average of all assigned risk scores under all identified risk information categories for the data. Generally, different risk scores assigned to different identified risk information categories may carry a different weight on a security risk on the user from the SNP depending on the characteristics associated with the user. In one embodiment, risk score assigning module 206 may use other statistical analysis methods known in the art to incorporate all assigned risk scores associated with the data depending on the relative security risks posed by each of the assigned risk scores.

At 309, risk score comparison module 208 may compare the sum of all assigned risk scores under all identified risk information categories for the data in the SNP with the sum of the threshold risk scores found in a table comprising threshold risk scores associated with multiple risk information categories, the threshold risk scores in the table being customized for one or more characteristics associated with the user.

In one embodiment, the table may reside in the risk mitigation data store and accessible by risk score assigning module 206 via the network 110. In instances where the sum is greater than the threshold risk score in the table, it would indicate that there is a security risk to the user from the data is deemed unsafe and therefore a risk mitigation measure may be needed. When the sum is greater than the threshold risk score, risk score assigning module 206 may transfer the data and the associated analyses to risk mitigation measure determination module 210.

At 311, risk mitigation measure determination module 210 may operate to determine one or more risk mitigation measures that may reduce, minimize or neutralize the security risk associated with the data. The risk mitigation measures evaluated by risk mitigation measure determination module 210 may include: modifying the data, deleting the data, retaining the data wherein the data is not posted to the social network component until receiving an instruction to post the data to the social network, removing metadata associated with the received data, and communicating a message regarding the data to a device. In one embodiment recommending a risk mitigation measure may be based on a risk tolerance setting of the user.

At 313, risk mitigation measure recommendation module 212 may operate to recommend a risk mitigation measure based on a determination made by risk mitigation measure determination module 210. In one scenario, the risk mitigation measure recommendation may include a suggestion to just remove a user's current location included in the user's SNP as a risk mitigation measure. In another scenario, the risk mitigation measure recommendation may include a suggestion to delay the posting of a SNP to a social network temporally until a security risk is eliminated. In another scenario, the risk mitigation measure recommendation may include a suggestion to allow sensitive data in a SNP to be selectively viewable only by a few people within the user's network that are on a list of "trusted members". In another scenario, the risk mitigation measure recommendation may include a suggestion to allow a complete unedited version of a SNP to be available for view by a few trusted members in user's network while simultaneously allowing an edited version that has been stripped of sensitive information, to be viewable by others. In another scenario, the risk mitigation measure recommendation may include a suggestion to strip off metadata such as, for example, GPS location information and time stamps associated with a SNP before it gets posted to a social network. In another scenario, the risk mitigation measure recommendation may include a suggestion to blur a portion of a digital image in order that a landmark present in the image may be rendered unrecognizable before SNP is posted to a social network. In another scenario, the risk mitigation measure recommendation may include a suggestion to trim a portion of a digital image. In another scenario the risk mitigation measure recommendation may include a suggestion for permitting only selected individuals in a user's social network to view certain data flagged to be sensitive. In another scenario, the risk mitigation measure recommendation may include posting the data on a social network after a defined period of time has elapsed. In another scenario, may include a suggestion for permitting only selected individuals in the user's social network to be able to view the whole unedited SNP after a defined period of time has elapsed. In another scenario, the risk mitigation measure recommendation may include a combination of two or more mitigation measure suggestions mentioned above.

Risk mitigation measure recommendation module 212 may communicate the risk mitigation measure recommendation to the user using understandable language. In one embodiment, risk mitigation measure recommendation module 212 may display a message on a GUI display of the computing device indicating the risk score and the risk mitigation measure that is being recommended for that risk score.

At 315, risk mitigation measure application module 214 may operate to apply the risk mitigation mechanism identified in step 313. In one embodiment applying, a risk mitigation measure may be based on a risk tolerance setting of the user. In one embodiment where the data in a SNP is previously shared on the social network, applying a risk mitigation measure may include generating new data based on applying a risk mitigation measure and replacing the data on the social network with the new data. In one embodiment, risk mitigation measure recommendation module 212 may automatically apply a risk mitigation measure without first recommending the same to the user. In one embodiment, Executing the risk mitigation measure may include SNP modification including: removing one or more text strings contained in the data, blurring a portion of a digital image included in the data, deleting a portion of a digital image included in the data, and permitting a selected group of individuals to view the data. Executing the risk mitigation measure may also include deleting or erasing the entire SNP. Executing the risk mitigation measure may also include retaining the SNP and delaying posting of the SNP to the social network, and storing the same in a database. Executing the risk mitigation measure may also include removing metadata associated with the SNP including removing a location metadata, and a time stamp metadata. Finally, executing the risk mitigation measure may also include communicating a message include sending an alert to a mobile device. In one embodiment, risk mitigation measure recommendation module 212 may upload a modified SNP the social network after a risk mitigation measure has been applied to it.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
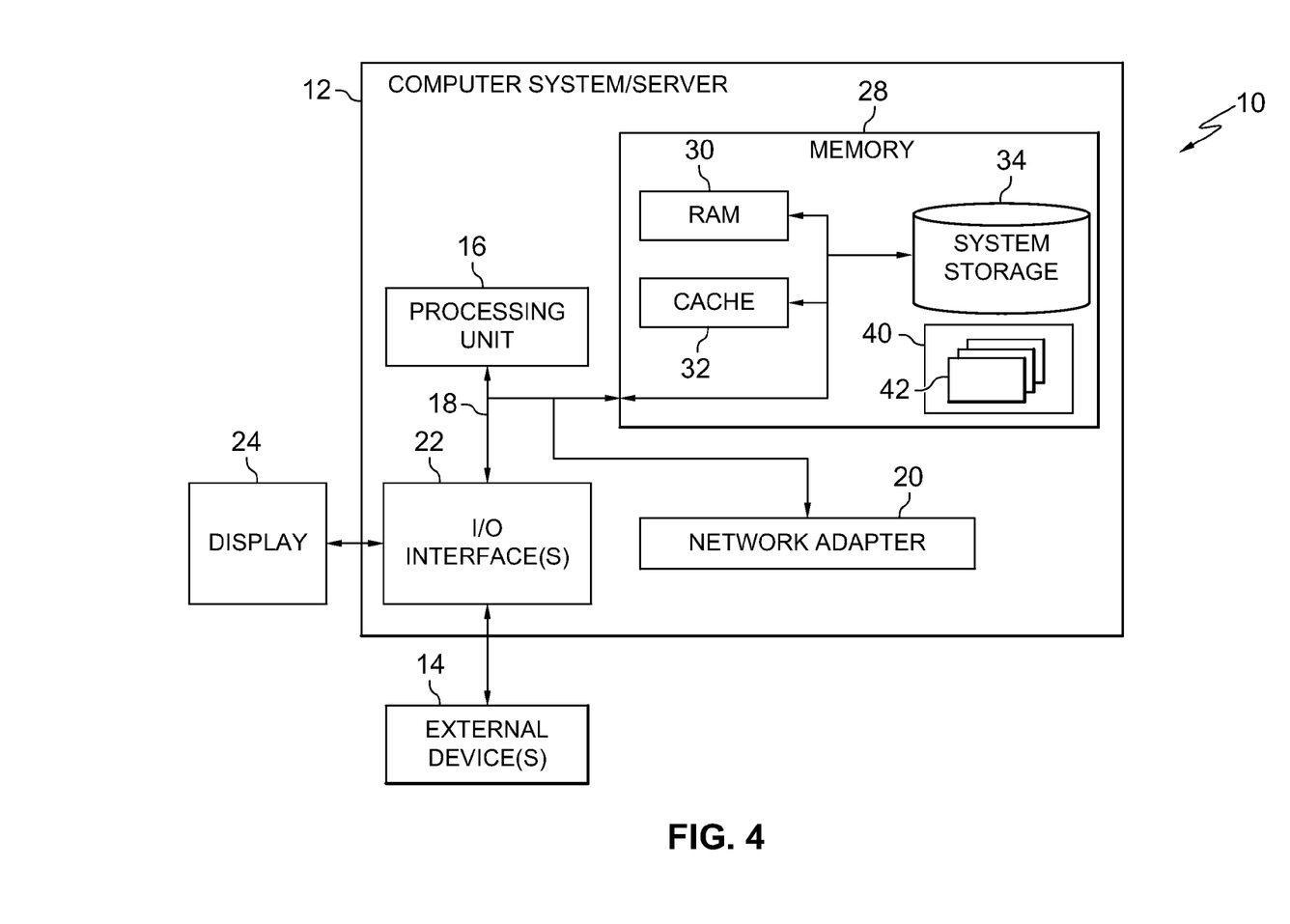
FIG. 4 is a functional block diagram illustrating a cloud computing node according to an embodiment of the present invention.

Referring now to FIG. 4, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 5:
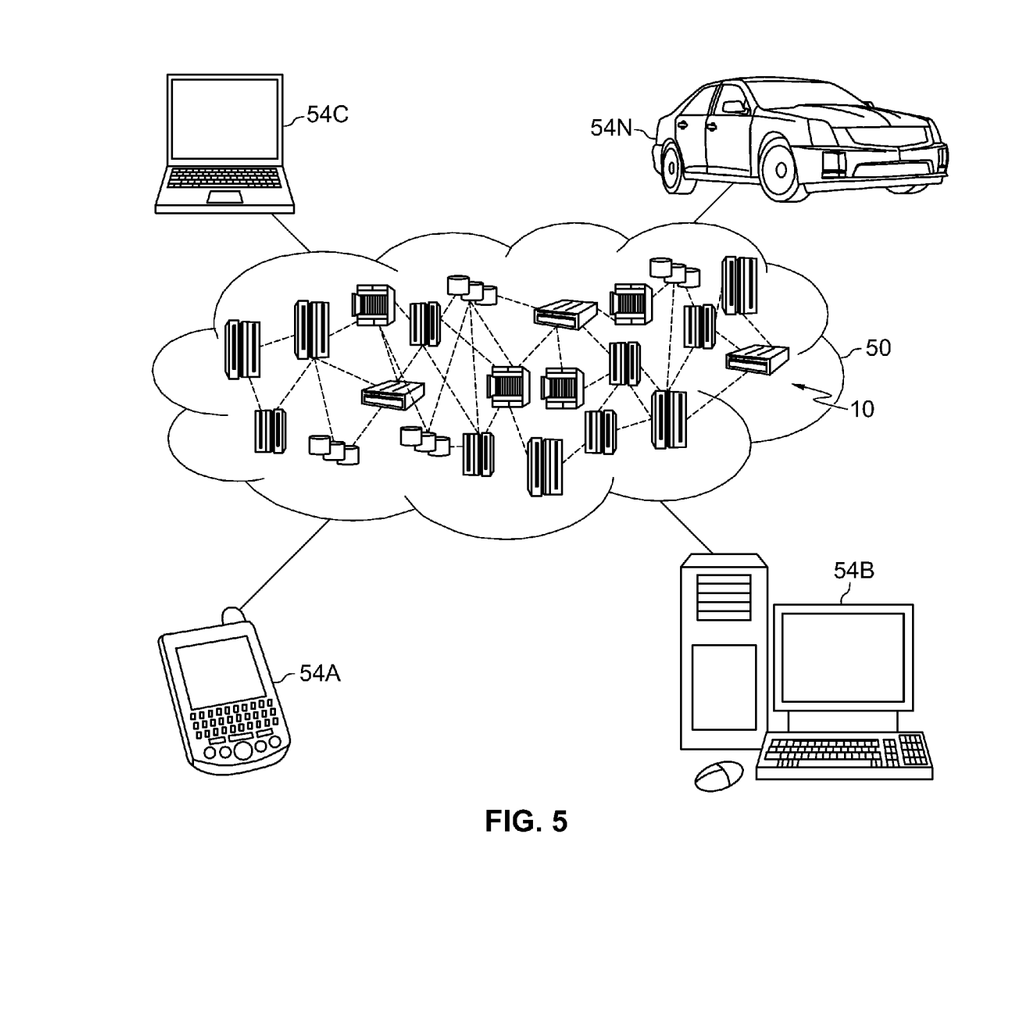
FIG. 5 is a functional block diagram illustrating a cloud computing environment according to an embodiment of the present invention.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 6:
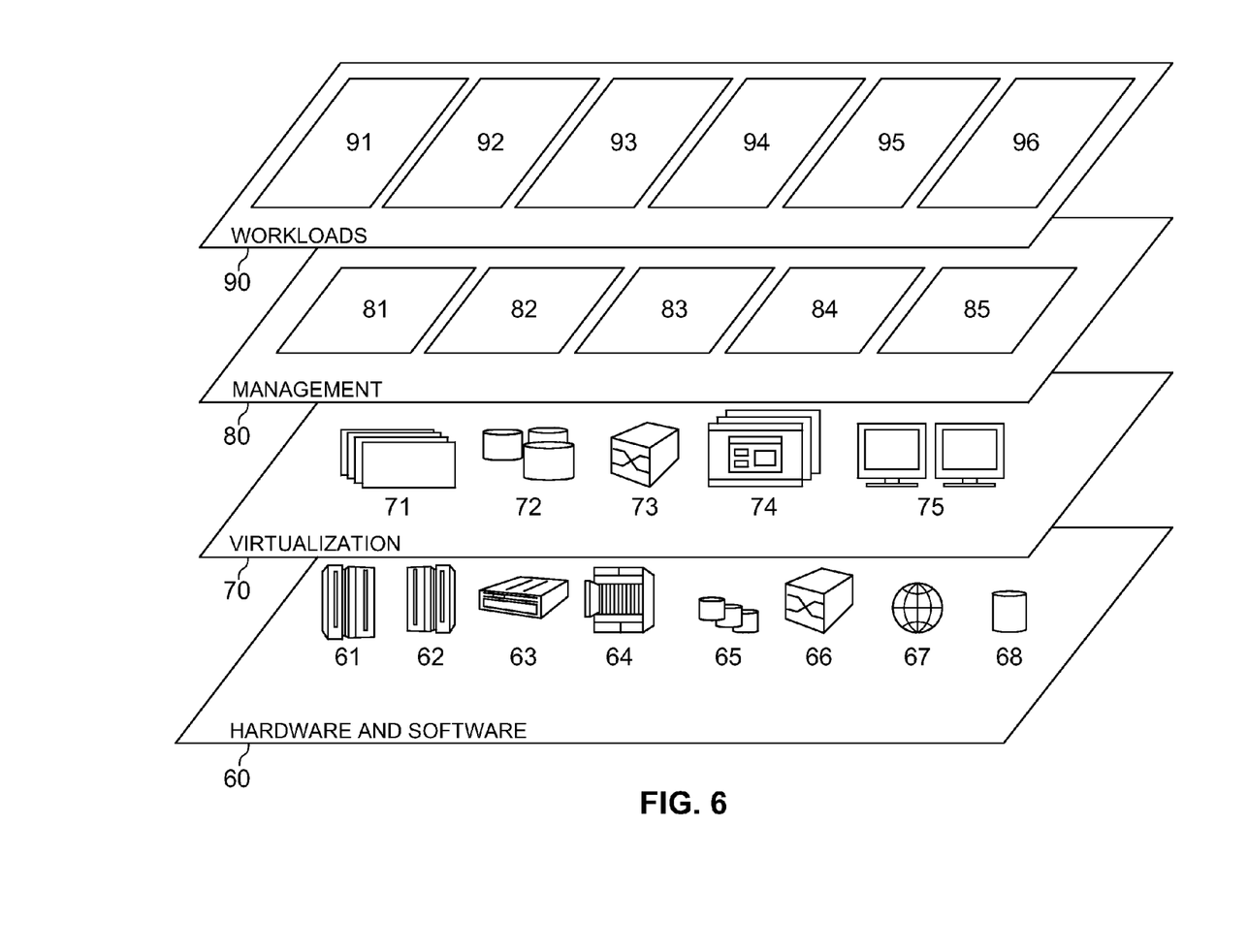
FIG. 6 is a functional block diagram illustrating abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, data privacy & information safety program 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be considered to fall within the scope of the invention.

What is claimed is:

1. A computer implemented method for dynamically evaluating and mitigating risk associated with data shared on a social network, the method comprising:

receiving posting data associated with a user, by a computing device, before posting on a social network;

analyzing the received posting data to identify a risk category corresponding with the received posting data using an analytics engine;

assigning the identified risk category to the analyzed posting data;

assigning a risk score to the assigned risk category based on predefined risk scores associated with the assigned risk category and one or more identifiable personal characteristics associated with the user found within the analyzed posting data;

generating a risk mitigation measure based on the assigned risk score being greater than a threshold risk score the risk mitigation measure comprising one or more of: modifying the posting data based on the one or more identifiable personal characteristics, retaining the posting data wherein the posting data is not posted to the social network until receiving an instruction to post the posting data to the social network, removing metadata associated with the one or more identifiable personal characteristics found within the posting data, and communicating a message regarding the posting data to a device;

executing the generated risk mitigation measure; and in response to executing the generated mitigation measure, uploading the posting data to the social network.

2. The method of claim 1, further comprising:

assigning one or more additional categories to the received data;

assigning one or more additional risk scores to the received data based on predefined risk scores associated with the one or more additional categories;

calculating a sum of the assigned risk scores and the one or more additional risk scores; and generating a risk mitigation measure when the sum is greater than a sum of threshold risk scores.

3. The method of claim 1, further comprising:

executing the risk mitigation measure, wherein, modifying the data comprises: removing one or more text strings contained in the data, blurring a portion of a digital image included in the data, deleting a portion of a digital image included in the data, and permitting a selected group of individuals to view the data;

deleting the data comprises erasing the received data;

retaining the data comprises delaying a posting of the data to the social network, and storing the data in a database;

removing metadata associated with the received data comprises removing one or more of: a location metadata, and a time stamp metadata; and communicating a message comprises sending an alert to a mobile device.

4. The method of claim 1, further comprising: posting the modified data to the social network.

5. The method of claim 1, wherein the threshold risk score is determined based on input from the user.

6. The method of claim 1, further comprising:

identifying an association of the received data with previously shared data on the social network, wherein assigning the risk score to the received data is further based on the received data and the previously shared data.

7. The method of claim 1, wherein the received data comprises one or more of: text, digital images, audio and video.

8. A computer program product for dynamically evaluating and mitigating risk associated with data shared on a social network, the computer program product comprising:
one or more computer-readable storage media and program instructions stored on the one or more computer-readable storage media, the program instructions comprising:
program instructions to receive posting data associated with a user, by a computing device, before posting on a social network;
program instructions to analyze the received posting data to identify a risk category corresponding with the posting data using an analytics engine;
program instructions to assign the identified risk category to the analyzed posting data;
program instructions to assign a risk score to the assigned risk category based on predefined risk scores associated with the assigned risk category and one or more identifiable personal characteristics associated with the user found within the analyzed posting data;
program instructions to generate a risk mitigation measure based on the assigned risk score being greater than a threshold risk score the risk mitigation measure comprising one or more of: modifying the posting data based on the one or more identifiable personal characteristics, retaining the posting data wherein the posting data is not posted to the social network until receiving an instruction to post the posting data to the social network, removing metadata associated with the one or more identifiable personal characteristics found within the posting data, and communicating a message regarding the posting data to a device;
program instructions to execute the generated risk mitigation measure; and
in response to executing the generated mitigation measure, program instructions to upload the posting data to the social network.

9. The computer program product of claim 8, further comprising:
program instructions to assign one or more additional categories to the received data;
program instructions to assign one or more additional risk scores to the received data based on predefined risk scores associated with the one or more additional categories;
program instructions to calculate a sum of the assigned risk scores and the one or more additional risk scores; and
program instructions to generate a risk mitigation measure when the sum is greater than a sum of threshold risk scores.

10. A computer system for dynamically evaluating and mitigating risk associated with data shared on a social network, the computer system comprising:
one or more computer processors;
one or more computer-readable storage media;
program instructions stored on the computer-readable storage media for execution by at least one of the one or more processors, the program instructions comprising:
program instructions to receive posting data associated with a user, by a computing device, before posting on a social network;
program instructions to analyze the received posting data to identify a risk category corresponding with the received posting data using an analytics engine;
program instructions to assign the identified risk category to the analyzed posting data;
program instructions to assign a risk score to the assigned risk category based on predefined risk scores associated with the assigned risk category and one or more identifiable personal characteristics associated with the user found within the analyzed posting data;
program instructions to generate a risk mitigation measure based on the assigned risk score being greater than a threshold risk score the risk mitigation measure comprising one or more of: modifying the posting data based on the one or more identifiable personal characteristics, retaining the posting data wherein the posting data is not posted to the social network until receiving an instruction to post the posting data to the social network, removing metadata associated with the one or more identifiable personal characteristics found within the posting data, and communicating a message regarding the posting data to a device;
program instructions to execute the generated risk mitigation measure; and
in response to executing the generated mitigation measure, program instructions to upload the posting data to the social network.

11. The computer system of claim 10, further comprising:
program instructions to assign one or more additional categories to the received data;
program instructions to assign one or more additional risk scores to the received data based on predefined risk scores associated with the one or more additional categories;
program instructions to calculate a sum of the assigned risk scores and the one or more additional risk scores; and
program instructions to generate a risk mitigation measure when the sum is greater than a sum of threshold risk scores.

12. The computer system of claim 10, further comprising:
program instructions to execute the risk mitigation measure, wherein;
program instructions to modify the data comprises: removing one or more text strings contained in the data, blurring a portion of a digital image included in the data, deleting a portion of a digital image included in the data, and permitting a selected group of individuals to view the data;
program instructions to delete the data comprises erasing the received data;
program instructions to retain the data comprises delaying a posting of the data to the social network, and storing the data in a database;
program instructions to remove metadata associated with the received data comprises removing one or more of: a location metadata, and a time stamp metadata; and
program instructions to communicate a message comprises sending an alert to a mobile device.

13. The computer system of claim 10, further comprising:
program instructions to post the modified data to the social network.

14. The computer system of claim 10, wherein the threshold risk score is determined based on input from the user.

15. The computer system of claim 10, further comprising:
    program instructions to identify an association of the received data with previously shared data on the social network, wherein program instructions to assign the risk score to the received data is further based on the received data and the previously shared data.

16. The computer system of claim 10, wherein the received data comprises one or more of: text, digital images, audio and video.

* * * * *